United States Patent
Ueno et al.

(10) Patent No.: US 8,296,761 B2
(45) Date of Patent: Oct. 23, 2012

(54) MEASURING CPU BUSY RATIO AND IDLE TIME OF MULTIPLE LPARS BY CALCULATING THE DIFFERENCE BETWEEN CONSECUTIVELY ACQUIRED ELAPSED TIME COUNTER IN THE VIRTUAL MACHINE SYSTEM

(75) Inventors: Hitoshi Ueno, Atsugi (JP); Tomohide Hasegawa, Zama (JP)

(73) Assignee: Hitachi, Ltd., Tokyo (JP)

( * ) Notice: Subject to any disclaimer, the term of this patent is extended or adjusted under 35 U.S.C. 154(b) by 1212 days.

(21) Appl. No.: 12/038,978

(22) Filed: Feb. 28, 2008

(65) Prior Publication Data
US 2008/0222632 A1 Sep. 11, 2008

(30) Foreign Application Priority Data
Mar. 9, 2007 (JP) ................................ 2007-060374

(51) Int. Cl.
G06F 9/45 (2006.01)
(52) U.S. Cl. ............................................ 718/1; 718/104
(58) Field of Classification Search ............... 718/1, 104
See application file for complete search history.

(56) References Cited

U.S. PATENT DOCUMENTS

| | | | | |
|---|---|---|---|---|
| 5,590,342 A | * | 12/1996 | Marisetty | 713/324 |
| 6,049,798 A | * | 4/2000 | Bishop et al. | 1/1 |
| 2002/0087611 A1 | * | 7/2002 | Tanaka et al. | 709/1 |
| 2002/0161961 A1 | * | 10/2002 | Hardin et al. | 711/6 |
| 2005/0004879 A1 | * | 1/2005 | Mathias et al. | 705/400 |
| 2006/0200819 A1 | * | 9/2006 | Cherkasova et al. | 718/1 |

FOREIGN PATENT DOCUMENTS

| | | | |
|---|---|---|---|
| JP | 62-080734 | | 4/1987 |
| JP | 2003-157177 | | 5/2003 |
| JP | 2003157177 A | * | 5/2003 |

* cited by examiner

*Primary Examiner* — Meng An
*Assistant Examiner* — Abu Z Ghaffari
(74) *Attorney, Agent, or Firm* — Antonelli, Terry, Stout & Kraus, LLP.

(57) ABSTRACT

A virtual machine system in which a physical CPU busy ratio can be measured in consideration of the status of an assignment of the physical CPU, and the measured CPU busy ratio can be reflected to a CPU busy ratio of each guest OS. An elapsed time counter is provided in a hypervisor, and a hypervisor access interface is provided in each of LPARs and used to read the elapsed time counter from the guest OS. A performance monitor program running on each guest OS calculates, based on a value of the elapsed time counter, the number of sampling timings expected to occur during the time when the physical CPU is not assigned to the LPAR in which the performance monitor program is provided.

5 Claims, 7 Drawing Sheets

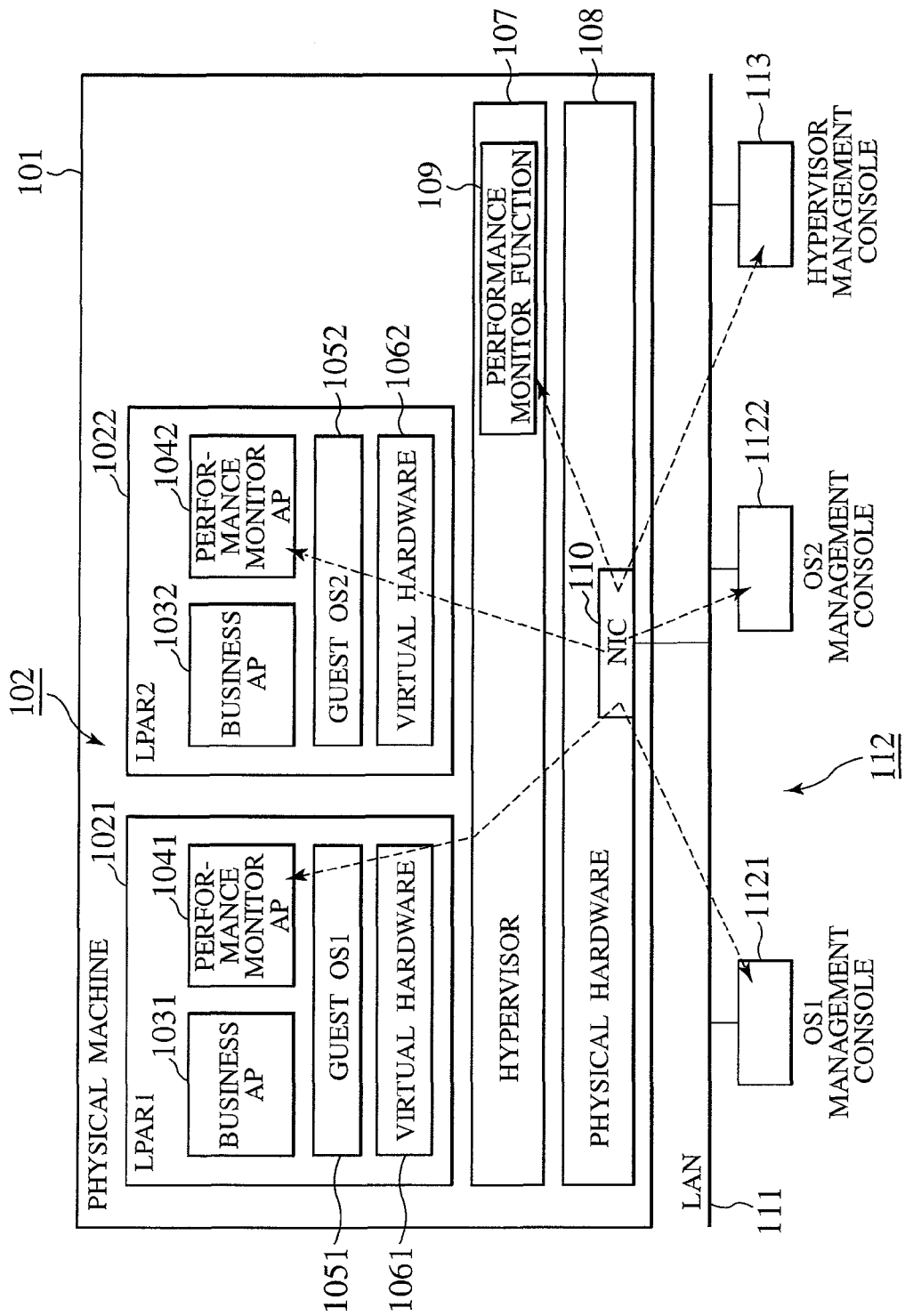

FIG.2

DISPLAY OF RESULTS OF MEASUREMENTS PERFORMED BY
PERFORMANCE MONITOR AP104 RUNNING ON GUEST OS

```
$ sar
22:30:00      CPU     %user    %nice    %system    %iowait    %idle
22:40:00      all     0.09     0.00     0.06       0.01       99.84
22:50:00      all     0.07     0.00     0.05       0.01       99.87
23:00:00      all     0.08     0.00     0.05       0.01       99.86
23:10:00      all     0.06     0.00     0.03       0.00       99.90
AVERAGE :     all     0.06     0.00     0.03       0.27       99.63
$
```

FIG.3

DISPLAY OF RESULTS OF MEASUREMENTS PERFORMED BY
PERFORMANCE MONITOR FUNCTION 109 PROVIDED ON HYPERVISOR

```
+-LPAR Usage-------( Sampling time 5 )----Proc ( D:2, S:2 )---------+
  #Name        SrvRatio   Srv(%)   Srv(ms)   Dsp(ms)   Busy(%)   DSp(%)
  1 LPAR1      100        16.6*    333*      27        8.1       50.9
  2 LPAR2      500        83.3*    1666*     26        1.5       49.0
  3 LPAR3      ---        ---      1000      26        2.6       49.0
  4 LPAR4      ---        ---      1000      27        2.7       50.9
  5
  6
  7
  8
  9
 10

Ded LPAR Total  ---      ---      2000      53        2.6
  Shr LPAR Total  600      99.9*    1999*     53        2.6

LPAR Total                                  106       2.6
  Hyper1                                      18        0.4
  Hyper2                                      74        1.8
```

PRINCIPLE OF METHOD FOR MEASUREMENT PERFORMED
BY PERFORMANCE MONITOR AP RUNNING ON GUEST OS

DISPLAY OF RESULTS OF MEASUREMENTS PERFORMED BY
PERFORMANCE MONITOR AP 104 RUNNING ON GUEST OS

```
$ sar
<CPU BUSY RATIO MEASURED ON GUEST OS>
22:30:00     CPU     %user   %nice   %system   %iowait   %idle
22:40:00     all     0.09    0.00    0.06      0.01      99.84
22:50:00     all     0.07    0.00    0.05      0.01      99.87
901 — 23:00:00     all     0.08    0.00    0.05      0.01      99.86
23:10:00     all     0.06    0.00    0.03      0.00      99.90
AVERAGE :    all     0.06    0.00    0.03      0.27      99.63

<CPU BUSY RATIO IN ENTIRE PYHSICAL MACHINE>
22:30:00     CPU     %user   %nice   %system   %iowait   %idle
22:40:00     all     0.04    0.00    0.03      0.02      99.90
22:50:00     all     0.03    0.00    0.02      0.01      99.92
902 — 23:00:00     all     0.04    0.00    0.03      0.01      99.90
23:10:00     all     0.03    0.00    0.01      0.00      99.95
AVERAGE :    all     0.03    0.00    0.02      0.27      99.86
$
```

MEASURING CPU BUSY RATIO AND IDLE TIME OF MULTIPLE LPARS BY CALCULATING THE DIFFERENCE BETWEEN CONSECUTIVELY ACQUIRED ELAPSED TIME COUNTER IN THE VIRTUAL MACHINE SYSTEM

BACKGROUND OF THE INVENTION

1. Field of the Invention

The present invention relates to a virtual machine system, and more particularly to measurement and display of a central processing unit (CPU) busy ratio of a guest operating system (OS) running on a logical partition (LPAR).

2. Description of the Related Art

In a virtual machine system, a single physical machine is divided into a plurality of logical partitions by a hypervisor; each of machine resources such as a CPU, a main memory and an input/output (I/O) interface is assigned to each of the logical partitions; and an OS runs on each of the logical partitions. Each of these OSs is called a guest OS. The execution of the guest OSs is controlled by a monitor program called a hypervisor.

The guest OS runs in the same way as general OSs from a logical perspective. A CPU performance monitor program running on the guest OS is executed in the same way as general performance monitor programs. The performance monitor program running on the guest OS measures a CPU busy ratio without the assumption that a physical CPU is assigned to the LPAR by the hypervisor or deassigned. Therefore, when the CPU assigned to the guest OS is fully utilized, the CPU busy ratio is displayed as 100% even if 50% of physical CPU resources are assigned to the LPAR.

In order to measure the physical CPU busy ratio (50% in the above case) of the guest OS in a virtual machine environment, it is necessary that the performance monitor program running on the guest OS and the performance monitor program of the hypervisor are executed for the same measurement interval and that both measurement results be multiplied.

For example, JP-A-2003-157177 discloses a virtual machine system in which the load of an OS running on each LPAR is measured, and in which an assignment of each of machine resources to each LPAR is dynamically changed based on the measured OS load and setting information according to a workload to be executed on each OS.

SUMMARY OF THE INVENTION

The above publication however does not disclose detail steps of a method for measuring the load of the OS running on each LPAR. According to the publication therefore the CPU busy ratio of the guest OS cannot be measured in consideration of the assignment rate of the physical CPU assigned by the hypervisor.

An object of the present invention is to provide a virtual machine system in which a physical CPU busy ratio can be measured in consideration of the status of an assignment of the physical CPU, and the measured CPU busy ratio can be reflected to a CPU busy ratio of each of guest OSs.

The virtual machine system according to the present invention includes a plurality of LPARs configured on a physical machine. Each of the LPARs has virtual hardware which is emulated by a control program for controlling an assignment of a hardware resource and a guest OS for controlling the virtual hardware. In the virtual machine system, a performance monitor program is executed on the guest OS to measure a CPU busy ratio. The measured logical CPU busy ratio is reflected to a busy ratio of the physical CPU assigned by the control program in order to allow each guest OS to be operated. The physical CPU busy ratio on the LPAR is displayed on a display unit.

Preferably, in order to detect a logical CPU busy ratio within the LPAR at a constant interval, the performance monitor program detects that an idle time exists in the LPAR when the physical CPU is not assigned to the LPAR for a time period between the two consecutive detections of the logical CPU busy ratio. The physical CPU busy ratio is calculated using the idle time as an idle time of the CPU provided in the LPAR, and the calculated physical CPU busy ratio is displayed.

More preferably, an elapsed time counter is provided in the hypervisor used as the control program, and an interface is provided on the guest OS running on the LPAR and used to read the elapsed time counter. The performance monitor program is executed to acquire a content of the elapsed time counter.

More preferably, a system call is provided as an interface with the performance monitor program running on the guest OS to request, to the guest OS, execution of reading and writing of a resource of the hypervisor. The system call is used to acquire the content of the elapsed time counter. More preferably, the hypervisor emulates the elapsed time counter as a type of an I/O device. A device driver dedicated for the I/O device is provided on the guest OS running on the LPAR. The performance monitor program reads the content of the elapsed time counter in accordance with an I/O command from the I/O device.

The virtual machine system according to another aspect of the present invention includes a physical machine having a plurality of LPARs configured therein. Each of the LPARs has virtual hardware and a guest OS for controlling the virtual hardware, and includes a performance monitor program as one of applications running on the guest OS. The virtual hardware is emulated by a hypervisor for controlling an assignment of a hardware resource. In the virtual machine system, an elapsed time counter is provided in the hypervisor, and an interface is provided to ensure that the guest OS reads the elapsed time counter. The performance monitor program acquires the content of the elapsed time counter through the interface to calculate the busy ratio of the physical CPU assigned by the hypervisor using the value of the elapsed time counter in order that the guest OS to be operated. The physical CPU busy ratio is displayed on a display unit.

Preferably, an emulator is provided as the interface to emulate the elapsed time counter in order to read the elapsed time counter, and a device driver is provided in the virtual hardware to access the emulator.

More preferably, the performance monitor program acquires the content of the elapsed time counter at a timing predetermined by a timer interrupt. The performance monitor program compares the lastly acquired counter value with the previously acquired counter value. The performance monitor program reflects a value obtained based on the difference between the two acquired counter values to a variable obtained by accumulating the number of sampling timings expected to occur due to the fact that the physical CPU is not assigned to the LPAR. The performance monitor program then calculates the variables to be displayed to ensure that the variables are changed. The calculated results are displayed on a display unit as the CPU busy ratio in the physical machine.

According to the present invention, the logical CPU busy ratio and the physical CPU busy ratio can be measured by the performance monitor program running on a guest OS and displayed.

BRIEF DESCRIPTION OF THE DRAWINGS

FIG. 1 is a diagram showing the configuration of a general virtual machine system.

FIG. 2 is a diagram showing an example of display of a result of measurement performed by a performance monitor AP running on a guest OS.

FIG. 3 is a diagram showing an example of display of performance measured by a performance monitor function provided on a hypervisor.

DETAILED DESCRIPTION OF THE PREFERRED EMBODIMENTS

Figure 4:
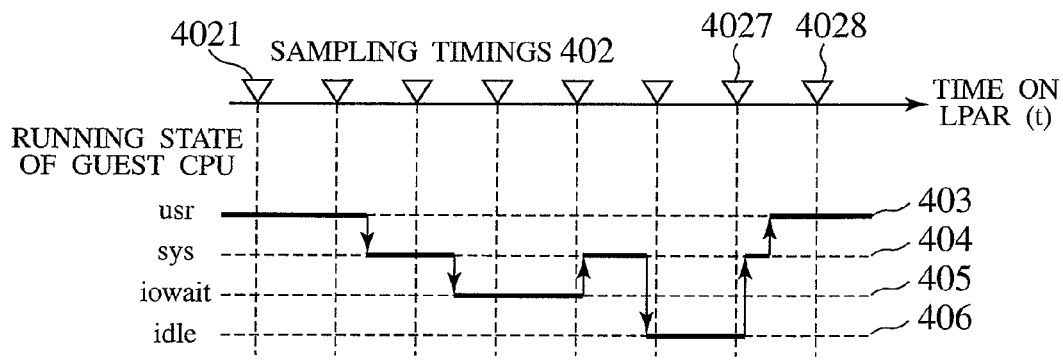
FIG. 4 is a conceptual diagram showing information acquired by the performance monitor AP running on the guest OS.

The configuration of a general virtual machine system and a performance monitor will be described with reference to FIG. 1. The general virtual machine system shown in FIG. 1 includes a physical machine 101 having physical hardware 108. A plurality of LPARs 102 are built and operated on the physical machine 101. A control program called a hypervisor 107 is executed to assign each of hardware resources to each of the plurality of LPARs 102. Each of the LPARs 102 is virtually operated as a single physical machine, and includes a virtual hardware 106 to be emulated by the hypervisor 107, a guest OS 105 for controlling the virtual hardware 106 and application programs (APs) 103 and 104 running on the guest OS 105.

There are a wide variety of application programs running on the guest OS 105. It is general that the following application programs running on the guest OS 105 are used: a business AP 103 necessary for business processing and a performance monitor AP 104 for measuring performance of the guest OS 105.

A management console 112 to be operated by an administrator is provided to manage the virtual machine system. The management console 112 is connected to a local area network (LAN) 111 through a network interface card (NIC) 110, the NIC 110 being implemented as the physical hardware 108 of the physical machine 101. The management consoles 1121 and 1122 are used for guest OSs 1051 and 1052 provided on a LPAR 1021 and 1022, respectively. The management console 113 is used for the hypervisor 107.

The performance monitor AP 104 measures performance of a CPU through an interaction with the guest OS 105. The performance monitor AP 104 then outputs the measurement result to the guest OS 105 and the OS management console 112 through the NIC 110. The hypervisor 107 includes a performance monitor function 109 for measuring performance of a resource to be controlled by the hypervisor and outputting the measurement result to the hypervisor management console 113 through the NIC 110.

FIG. 2 is a diagram showing a display example of a results of the measurements performed by the performance monitor AP 104 running on the guest OS, the results being output from the performance monitor AP 104 to the OS management console 112 and indicating the CPU busy ratios.

In the example, the following rates related to all CPUs are displayed for every ten minutes: % user (a rate of execution of a program running in a user mode); % nice (a rate of execution of a program running at a priority changed from a standard execution priority); % system (a rate of execution of a program running in a supervisor mode); %iowait (a rate of the waiting state of an I/O, such as a disk or a network, run by the guest OS on the LPAR); and % idle (a rate of the waiting state of the CPU executing no processing). The above results are measured under the condition that when the physical CPU assigned to the LPAR is completely utilized, the CPU busy ratio is expressed as 100%.

FIG. 3 is a diagram showing a display example of results of the measurements performed by the performance monitor function 109, the results being output from the performance monitor function 109 to the hypervisor management console 113. In the example, the result of the assignment of the physical CPU to each LPAR is displayed in the column of "Dsp (%)", the assignment being measured for every five seconds (sampling time 5). The LPAR1 (LPAR 1021) and LPAR2 (LPAR 1022) operate in a sharing mode in which the physical CPU is shared. The results indicate that the rates of the assignments of the CPU to the LPAR1 and LPAR2 are 50.9% and 49%, respectively.

Each of the rates of the assignments is a rate related to an execution time of the physical CPU assigned to the LPAR by the hypervisor 107. The performance monitor AP cannot measure how the guest OS uses the CPU capability (usr, sys, iowait, and idle).

FIG. 4 is a diagram showing a principle of the method for measuring the performance of the CPU, the method being performed by the performance monitor AP 104 running on the guest OS.

In FIG. 4, an abscissa axis t represents detected execution times and idle time of the CPU used by the guest OS running on the LPAR. The performance monitor AP detects the types of processing executed by the CPU at predetermined sampling timings 402 (e.g., at an interval of 100 milliseconds) for a specified measurement period (e.g., ten minutes). The performance monitor AP detects and collects the types of processing executed by the CPU and the number of the executions at all the sampling timings 4021 to 4028, and calculates each of the busy ratios of the types of processing, in order to measure the CPU busy ratios.

For example, when the performance monitor AP monitors the CPU at eight sampling timings for the measurement period, and detects three times (sampling timings 4021, 4022, 4028) that the CPU processes a program running in the usr mode, the rate (usr rate) of the user mode is expressed as 3 times/8 times=37.5%. The CPU busy ratio in the user mode is 37.5%.

Figure 5:
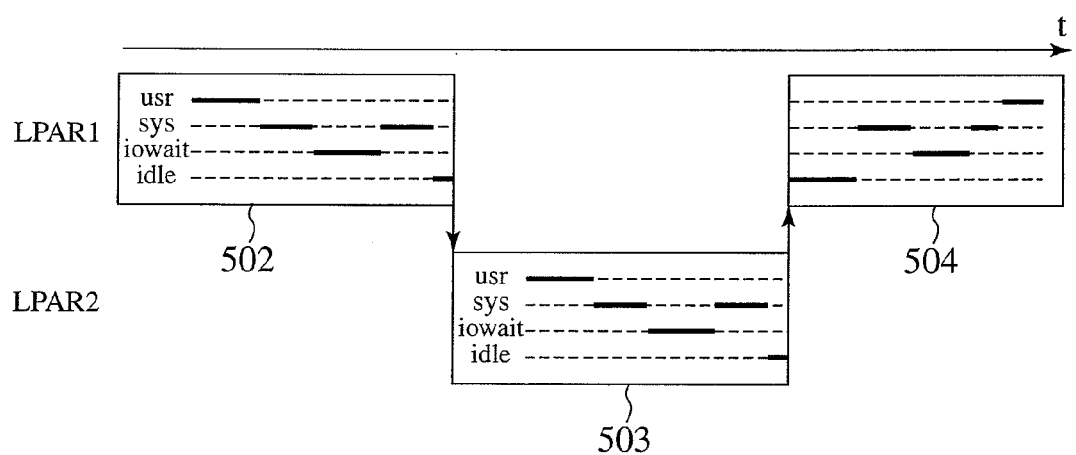
FIG. 5 is a conceptual diagram showing physical CPU dispatches in the case where the physical CPU is shared by two LPARs.

FIG. 5 is a diagram showing the case where the LPAR1 and the LPAR2 alternately use a single physical CPU. In FIG. 5, an abscissa axis t indicates an elapsed time. The assignment of the CPU execution to the LPAR1 is stopped at a timing 502. The execution of the CPU is then assigned to the LPAR2 at a timing 503, and then assigned to the LPAR1 at the next timing 504. In this case, the performance monitor AP provided on the guest OS running on the LPAR1 measures performance of the CPU on the assumption that the timings 502 and 504 are continuous.

Figure 6:
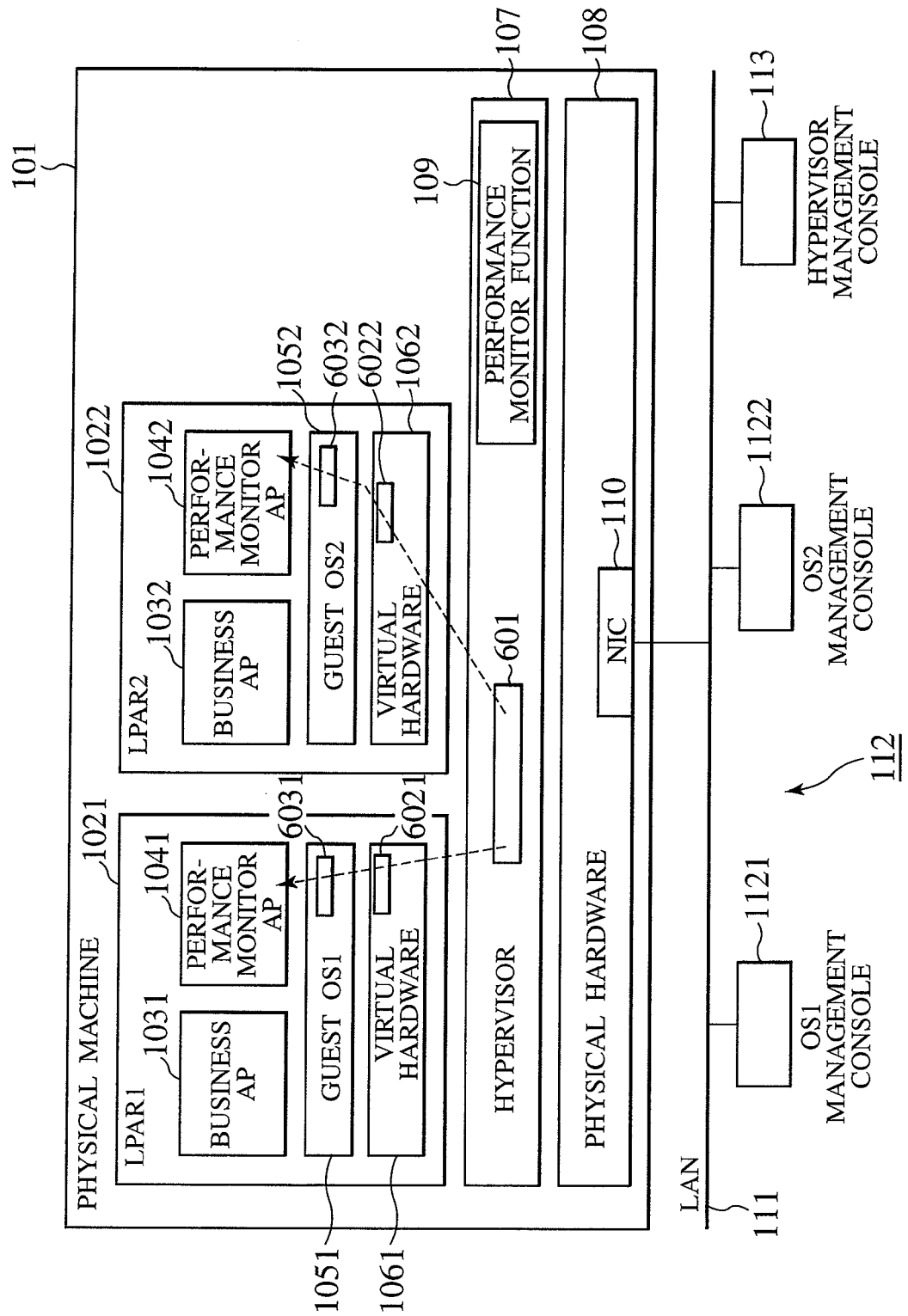
FIG. 6 is a diagram showing the configuration of a virtual machine system according to an embodiment of the present invention.

FIG. 6 is a diagram showing the configuration of a virtual machine system according to an embodiment of the present invention. An elapsed time counter 601 is provided in the hypervisor 107. An interface is provided for each guest OS 105 to ensure that the performance monitor AP 104 running on each guest OS 105 reads the elapsed time counter 601. The interface provided for each guest OS 105 can be achieved by providing a special system call (hypervisor call) for supporting a virtualization function which is adapted to instruct the hypervisor to read a content of a specified memory address. In this case, an emulator 602 and a device driver 603 shown in FIG. 6 are not necessary.

In another example, the emulator 602 is provided on each of virtual hardware 106 to emulate the elapsed time counter 601, and the device driver 603 is provided on the guest OS 105. The device driver 603 is used as an interface with the virtual hardware 106 and dedicated for the I/O device. The performance monitor AP 104 reads a value obtained by emulating the elapsed time counter 601 using the emulator 602 through the device driver 603 in accordance with the input and output (I/O) command from the I/O device. In this case, the special system call described above is not necessary.

The elapsed time counter 601 is included in a memory and can be achieved by the fact that the hypervisor 107 periodically writes a value proportional to a certain time into the elapsed time counter 601. For example, the hypervisor 107 adds one to a value of the elapsed time counter 601 at an interval of ten milliseconds. The elapsed time counter 601 may be achieved by an interface which reads a real time clock on the physical hardware.

Figure 7:
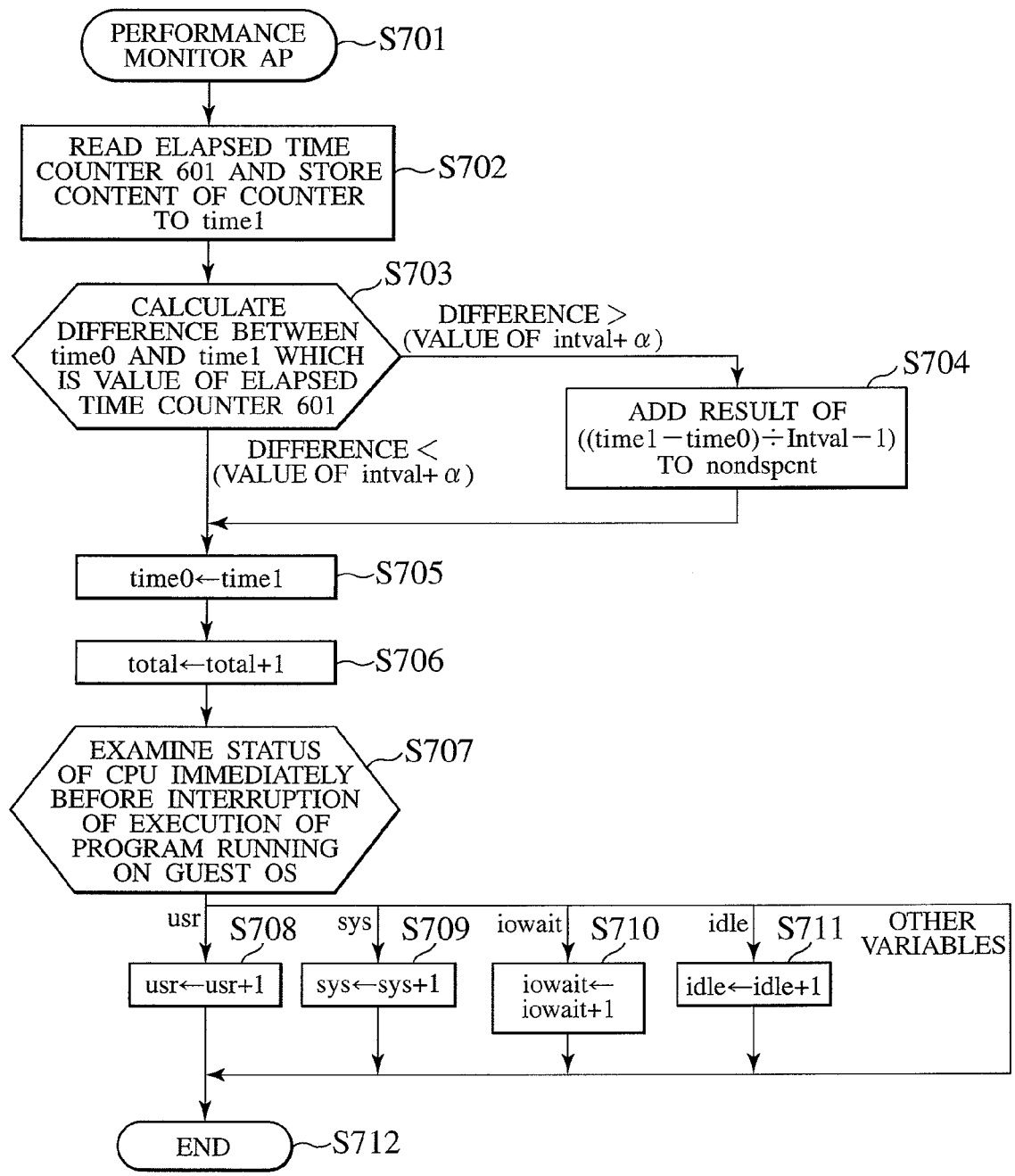
FIG. 7 is a flowchart showing measurement processing performed by the performance monitor AP according to the embodiment.

FIG. 7 is a flowchart showing processing of the performance monitor AP 104 started at each sampling timing 403.

The performance monitor AP 104 is periodically started at a predetermined timing (variable: intval) determined by a timer interrupt in step S701. The performance monitor AP 104 then reads the elapsed time counter 601, and causes a value indicated by the elapsed time counter 601 to be stored into a variable time1 in step S702.

The time when the performance monitor AP 104 is started is stored in a variable time0 at the previous sampling timing. The performance monitor AP 104 calculates the difference (time1−time0) between the variable time 0 and the variable time1 in step S703. When the difference is sufficiently larger than the value of the variable intval (e.g., when the difference is not smaller than a value of (intval×1.2)), the performance monitor AP 104 adds a value (which is expressed as (time1−time0)/intval−1)) to a variable nondspcnt obtained by accumulating the number of sampling timings expected to occur due to the fact that the physical CPU is not assigned to the LPAR in step S704.

When the difference (time1−time0) is nearly equal to the value of the variable intval, it is considered that execution of the CPU in the LPAR is not interrupted (the CPU is not in an idle state) for a period between the two consecutive sampling timings. The performance monitor AP 104, therefore, assigns the value of the variable time1 to the variable time0 in step S705 without executing other processing.

Next, the performance monitor AP 104 causes a variable total to be counted up in step S706, the variable total being used to count the number of elapsed sampling timings. The performance monitor AP 104 examines the status of the CPU immediately before an interruption of execution of the performance monitor AP 104 running on the guest OS in step S707.

As a result of the examination, if a program for the user mode runs before the interruption, a value of the variable usr is counted up in step S708. If a program for the system mode having a privileged mode runs before the interruption, a value of the variable sys is counted up in step S709. If the CPU is in the state of waiting for completion of the startup of the I/O device before the interruption, a value of the variable iowait is counted up in step S710. If the CPU does not execute any processing before the interruption, a value of the variable idle is counted up in step S711.

After the completion of the above steps, the execution of the performance monitor AP 104 is stopped in step S712. Then, The performance monitor AP 104 starts to repeat the processing from step S701 at the next sampling timing.

Figures 9, 10:
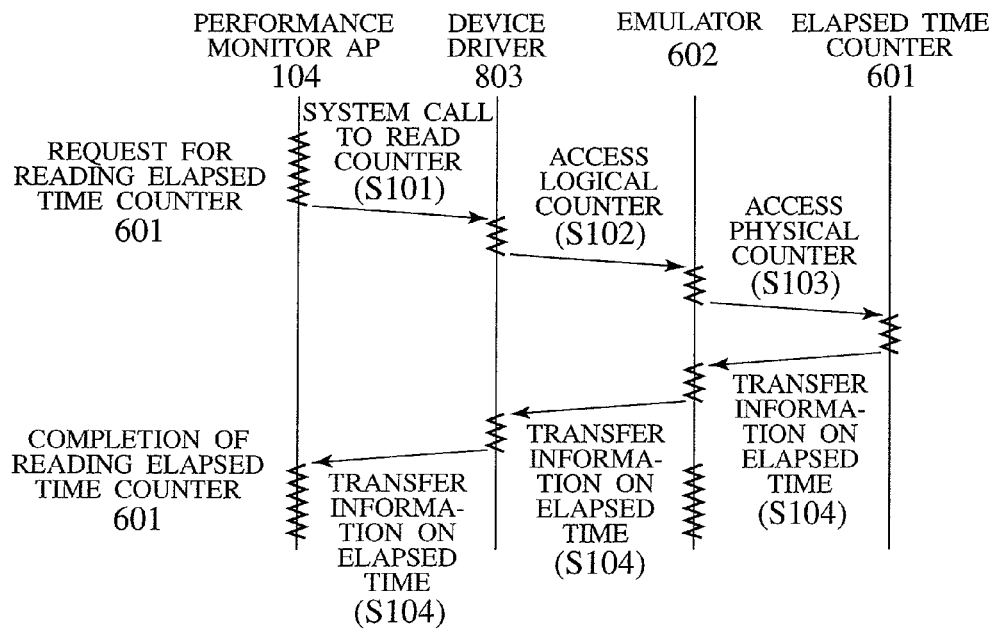
FIG. 9 is a diagram showing an example of display of a performance monitoring according to the embodiment.
FIG. 10 is a time chart showing execution of the measurement performed by the performance monitor AP according to the embodiment.

FIG. 10 is a time chart showing processing performed by each of the parts (which are the performance monitor AP 104, the device driver 603, the emulator 602, and the elapsed time counter 601) from another perspective, the processing being related to the processing shown in FIG. 7.

In the example shown in FIG. 10, in the case where the performance monitor AP 104 reads the elapsed time counter 601, the emulator 602 and the device driver 603 are used. The emulator 602 is adapted to emulate the elapsed time counter 601, and the device driver 603 is installed in the guest OS 105 running on the LPAR in order to access the emulator 602.

When a request for reading the elapsed time counter 601 is generated on the performance monitor AP 104, a system call to the guest OS is issued to instruct the device driver 603 to read time information in step S101.

The device driver 603 receives the instruction and then performs access in order to acquire a content of a logical counter in step S102. That is, the device driver 603 controls access for reading the emulator 602. The emulator 602 detects the access and then acquires a value of the physical elapsed time counter 601 managed by the hypervisor (that is, the emulator 602 accesses the physical counter) in step S103.

The emulator 602 acquires information on the elapsed time from the physical elapsed time counter 601, and the device driver 603 then reads the information from the emulator 602. The device driver 603 then transfers, in step S104, the information on the elapsed time as a return value to the performance monitor AP 104, which is an issuer of the system call.

Figure 8:
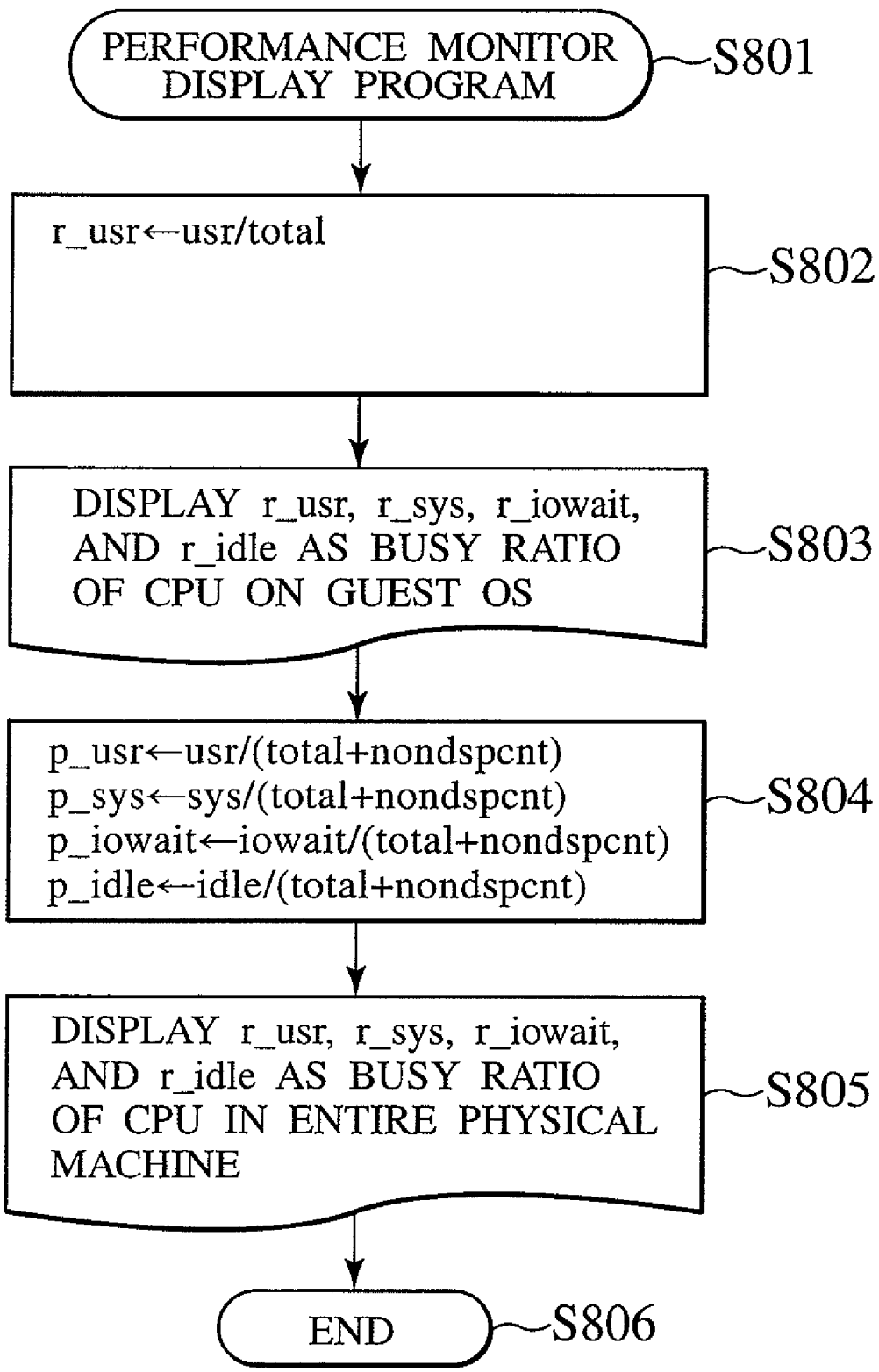
FIG. 8 is a flowchart showing processing for displaying a result of measurement performed by the performance monitor AP according to the embodiment.

FIG. 8 is a flowchart showing operations of processing for outputting the results of the measurements performed by the performance monitor AP 104.

Firstly, the OS management console 112 provides a command to the performance monitor AP 104 to order it to display the performance of the CPU. A performance monitor display program then starts to be executed in step S801. Each of values of usr, sys, iowait, and idle is divided by the value of total in step S802. The CPU busy ratios of the guest OS are displayed on the OS management console 112 in step S803. The operation in step S803 is the same as a conventional output operation. Similar information to that shown in FIG. 2 is displayed.

Next, each of the values of usr, sys, iowait, and idle is divided by the value of (total+nondspcnt) in step S804. Each of the results of the divisions is displayed on the hypervisor management console 113 as the CPU busy ratio in the entire physical machine in step S805. The processing for outputting the results is ended in step S806.

FIG. 9 is a diagram showing a display example of the results obtained by the calculations in steps S804 and S805. The display includes CPU busy ratios 901 measured on the guest OS and CPU busy ratios 902 in the entire physical machine. Displaying the CPU busy ratios 902 makes it possible to measure and display the performance of the CPU in consideration of the physical CPU busy ratios.

As described above, the hypervisor, the performance monitor AP, and the guest OS are appropriately controlled to measure the physical CPU busy ratios and reflect the measured CPU busy ratios to the CPU busy ratios for each guest OS. In a conventional technique, a performance monitor program running on a guest OS and a performance monitor program running on a hypervisor do not measure the CPU busy ratio at completely the same time interval. Therefore, even if a recalculation is performed, results of measurement of the CPU performance by the program running on the guest OS may be different from results of measurement of the CPU performance by the program running on the hypervisor in the conventional technique. According to the embodiment of the present invention, a recalculation is not necessary, and accuracy of the calculations of the CPU busy ratios is expected to be improved. This makes it possible for the virtual machine system to manage the performance of the CPU with high efficiency.

What is claimed is:

1. A virtual machine system comprising:
a plurality of LPARs configured on a physical machine, each of the LPARs having virtual hardware to be emulated by a control program for controlling an assignment of a hardware resource and a guest OS for controlling the virtual hardware;
means running on the guest OS for measuring a CPU busy ratio and reflecting the measured CPU busy ratio to a busy ratio of a physical CPU for each of the guest OS; and
a display unit for displaying the busy ratio of the physical CPU used by each of the LPARs at a predetermined interval,
wherein:
in order to detect a busy ratio of a logical CPU provided in any one of the LPARs at a predetermined sampling timing, said measuring means detects that an idle time exists in the LPAR when the physical CPU is not assigned to any of the LPARs for a time period between timings of the two consecutive detections of the busy ratio of the logical CPU; and
the busy ratio of the physical CPU is calculated using the idle time as an idle time of the CPU provided in the LPAR, and the calculated busy ratio of the physical CPU is displayed,
wherein:
an elapsed time counter is provided in a hypervisor used as the control program for counting an elapsed time;
an interface is provided to read the elapsed time counter on the guest OS running on the LPAR; and
a content of the elapsed time counter is acquired under execution of said measuring means, and
wherein said measuring means:
acquires a content of the elapsed time counter at a timing predetermined by a time interrupt,
calculates a difference between the lastly acquired value of the elapsed time counter and the previously acquired value of the elapsed time counter,
reflects the calculated difference to a variable obtained by accumulating the number of sampling timings expected to occur due to the fact that the physical CPU is not assigned to the LPAR in which the measuring means is provided,
calculates each of variables to be displayed to ensure that the variables are changed, and
displays results of the calculations on the display unit as CPU busy ratios in the physical machine.

2. The virtual machine system according to claim 1, wherein
a system call is provided as an interface with said measuring means running on the guest OS to request, to the guest OS, execution of reading and writing of a resource of the hypervisor, and is used to acquire the content of the elapsed time counter.

3. The virtual machine system according to claim 1, wherein
each of said virtual hardware provides an emulator to emulate the elapsed time counter and a device driver on the guest OS of which is used as the interface with the virtual hardware and dedicated for an I/O device, and wherein said measuring means reads a value obtained by emulating the elapsed time counter using the emulator through the device driver in accordance with an I/O command from the I/O device.

4. A virtual machine system comprising:
a plurality of LPARs configured on a physical machine, each of the LPARs having virtual hardware to be emulated by a hypervisor for controlling an assignment of a hardware resource, a guest OS for controlling the virtual hardware, and a performance monitor program to be used as one of applications running on the guest OS;
an elapsed time counter equipped on the hypervisor; for counting an elapsed time;
an interface used to read the elapsed time counter from the guest OS into each of the LPARs; and
a display unit displays information as a result of execution of the performance monitor program;
wherein the performance monitor program acquires a content of the elapsed time counter through the interface, uses a value of the elapsed time counter to calculate a busy ratio of a physical CPU assigned by the hypervisor in order to allow the guest OS to be operated, and displays the busy ratio of the physical CPU on the display unit, and
wherein the performance monitor program:
acquires a content of the elapsed time counter at a timing predetermined by a time interrupt,
calculates a difference between the lastly acquired value of the elapsed time counter and the previously acquired value of the elapsed time counter,
reflects the calculated difference to a variable obtained by accumulating the number of sampling timings expected to occur due to the fact that the physical CPU is not assigned to the LPAR in which the performance monitor program is provided,
calculates each of variables to be displayed to ensure that the variables are changed, and
displays results of the calculations on the display unit as CPU busy ratios in the physical machine.

5. The virtual machine system according to claim 4, further comprising:
an emulator provided as the interface for emulating the elapsed time counter to read the elapsed time counter, and
a device driver provided in the virtual hardware to access the emulator.

* * * * *